United States Patent
Leask et al.

(10) Patent No.: US 11,682,250 B2
(45) Date of Patent: Jun. 20, 2023

(54) WIRELESS SMART LOCK SYSTEMS

(71) Applicants: Olivia Jane Leask, San Jose, CA (US);
Ryan James Leask, San Jose, CA (US)

(72) Inventors: Olivia Jane Leask, San Jose, CA (US);
Ryan James Leask, San Jose, CA (US)

( * ) Notice: Subject to any disclaimer, the term of this patent is extended or adjusted under 35 U.S.C. 154(b) by 447 days.

(21) Appl. No.: 16/871,592

(22) Filed: May 11, 2020

(65) Prior Publication Data
US 2020/0364960 A1    Nov. 19, 2020

Related U.S. Application Data

(60) Provisional application No. 62/847,305, filed on May 13, 2019.

(51) Int. Cl.
| | | |
|---|---|---|
| *G07C 9/00* | (2020.01) | |
| *E05B 47/00* | (2006.01) | |
| *H04W 4/80* | (2018.01) | |
| *G05B 15/02* | (2006.01) | |
| *H04W 84/18* | (2009.01) | |
| *E05B 65/00* | (2006.01) | |

(52) U.S. Cl.
CPC ........ *G07C 9/0069* (2013.01); *E05B 47/0001* (2013.01); *G05B 15/02* (2013.01); *G07C 9/00309* (2013.01); *G07C 9/00571* (2013.01); *H04W 4/80* (2018.02); *E05B 65/0007* (2013.01); *E05Y 2900/40* (2013.01); *H04W 84/18* (2013.01)

(58) Field of Classification Search
CPC .............. G07C 9/0069; G07C 9/00309; G07C 9/00571; G07C 2209/08; G07C 9/00896; G07C 9/00944; E05B 47/0001; E05B 65/0007; E05B 47/026; E05B 47/0012; E05B 2047/0094; E05B 2047/0095; G05B 15/02; H04W 4/80; H04W 84/18; E05Y 2900/40
USPC ............................................. 340/5.7; 70/263
See application file for complete search history.

(56) References Cited

U.S. PATENT DOCUMENTS

| | | | | |
|---|---|---|---|---|
| 5,392,025 A | * | 2/1995 | Figh ....................... | G08B 13/14 70/264 |
| 5,933,086 A | * | 8/1999 | Tischendorf ....... | G07C 9/00817 340/5.64 |
| 6,552,650 B1 | * | 4/2003 | Gokcebay .......... | G07C 9/00944 340/5.73 |

(Continued)

*Primary Examiner* — Nam V Nguyen
(74) *Attorney, Agent, or Firm* — Ravi Mohan; Rutan & Tucker, LLP (57) ABSTRACT

Systems and methods for providing a wireless lock system include a locking device wherein the locking device comprises a retractable bolt and a wireless communication transceiver. The systems and methods can also include a bolt catch that is configured to couple with the retractable bolt, wherein, when coupled, the bolt and locking device are locked into a static position relative to the bolt catch. A keypad programmable with a plurality of combination buttons and a wireless communication transceiver can be configured to communicate with the bridge wirelessly. The bolt then protrudes from the locking device to couple with the bolt catch and decouples from the bolt catch and recedes into the locking device in response to one or more wireless signals received from a wireless device. A wireless communication bridge device may also be utilized to provide additional wireless communication links to further devices to expand user reach and interoperability.

21 Claims, 6 Drawing Sheets

(56) References Cited

U.S. PATENT DOCUMENTS

| | | | | |
|---|---|---|---|---|
| 6,698,263 B2 * | 3/2004 | Hsieh | | E05B 47/026 70/108 |
| 7,950,748 B2 * | 5/2011 | Coutermarsh | | E05B 51/02 70/277 |
| 8,368,507 B2 * | 2/2013 | Conreux | | G05B 19/02 340/5.2 |
| 8,516,864 B2 * | 8/2013 | Greiner | | E05B 47/0607 292/201 |
| 8,682,245 B2 * | 3/2014 | Fyke | | G07C 9/20 455/410 |
| 9,396,598 B2 * | 7/2016 | Daniel-Wayman | | G07C 9/27 |
| 9,514,585 B2 * | 12/2016 | Ahearn | | H04W 4/80 |
| 9,697,664 B2 * | 7/2017 | Ribas | | G07C 9/00817 |
| 10,096,183 B2 * | 10/2018 | Nitu | | G07F 9/001 |
| 10,423,136 B2 * | 9/2019 | Davis | | G07C 9/00309 |
| 10,443,266 B2 * | 10/2019 | Johnson | | G07C 9/00944 |
| 10,672,211 B2 * | 6/2020 | Flynn | | G07C 9/00896 |
| 10,679,457 B1 * | 6/2020 | Wu | | G07F 17/12 |
| 11,158,145 B2 * | 10/2021 | Beck | | G06F 21/34 |
| 2002/0180582 A1 * | 12/2002 | Nielsen | | G07C 9/21 340/5.6 |
| 2007/0257773 A1 * | 11/2007 | Hill | | E05B 47/0012 70/278.1 |
| 2010/0000274 A1 * | 1/2010 | Viso Cabrera | | E05B 17/22 70/278.7 |
| 2012/0011366 A1 * | 1/2012 | Denison | | G07C 9/00571 707/812 |
| 2012/0126936 A1 * | 5/2012 | Harkins | | G07C 9/21 340/5.2 |
| 2016/0042581 A1 * | 2/2016 | Ku | | G07C 9/00309 340/5.61 |
| 2016/0133071 A1 * | 5/2016 | Henderson | | G07C 9/0069 70/277 |
| 2016/0180618 A1 * | 6/2016 | Ho | | G07C 9/00563 340/5.52 |

* cited by examiner

FIG. 5D

WIRELESS SMART LOCK SYSTEMS

PRIORITY

This application claims the benefit of and priority to U.S. Provisional Application No. 62/847,305, filed May 13, 2019, which is incorporated by reference in its entirety herein.

FIELD

The present disclosure technically relates to locking systems. More particularly, the present disclosure technically relates to wireless smart lock systems.

BACKGROUND

Unlocked entryways, doors, and gates increase security risk. In order to mitigate this risk, consumers have resorted to traditional locks which may include key-based locks, combination locks, and other biometric based locks. As consumers increasingly rely on delivery services, temporary help, and avoiding package theft, short-term access is increasingly desired.

Unfortunately, traditional locking systems are often unable to provide such short-term access or are able to do so at extreme cost and/or convenience. For example, allowing short term access via key requires direct physical transfer of the key prior to the person who is to gain access, or the key must be left in a location that can be potentially accessed by anyone. Similarly, combination locks must be either discarded or have their combinations reset after reach short-term access use, which may be overly cumbersome for a consumer to utilize when desired.

Furthermore, utilizing locks on certain areas, like yard gates may also increase risk by failing to provide a quick means of escape if a danger, such as fire, should present itself. In many locations, it may be desired to lock a gate or other entryway where a mortise or other hardware is not available. Therefore, use of traditional and secure lock systems have been avoided for many areas that would otherwise benefit from them due to safety and/or convenience reasons. It is thus desired to provide a method or system that can grant short-term access while allowing for one-way locking and easy escape if needed.

BRIEF DESCRIPTION OF DRAWINGS

The above, and other, aspects, features, and advantages of several embodiments of the present disclosure will be more apparent from the following description as presented in conjunction with the following several figures of the drawings.

Corresponding reference characters indicate corresponding components throughout the several figures of the drawings. Elements in the several figures are illustrated for simplicity and clarity and have not necessarily been drawn to scale. For example, the dimensions of some of the elements in the figures might be emphasized relative to other elements for facilitating understanding of the various presently disclosed embodiments. In addition, common, but well-understood, elements that are useful or necessary in a commercially feasible embodiment are often not depicted in order to facilitate a less obstructed view of these various embodiments of the present disclosure.

DETAILED DESCRIPTION

In response to the problems described above in regards to, systems and methods are described herein that describe processes for providing wireless smart locking. Specifically, in many embodiments, wireless smart locking can be accomplished by utilizing a wireless locking device, a bolt catch, and wireless keypad. In these embodiments, the locking device and keypad include wireless transceivers that establish and provide communication links that allow the keypad to enter send lock and unlock signals to the locking device that can protrude (i.e. "extract") and retract a bolt to couple with the bolt catch. In further embodiments, a wireless communication bridge device may be utilized to facilitate communications between the keypad and locking device over longer distances. The wireless communication bridge may also be configured to communicate with a smart lock application on a mobile computing device, an internet connected server, smart home device, etc. It is contemplated that various embodiments of the invention may comprise the locking device, bolt catch, keypad, wireless communication bridge and smart lock application working and communicating together as one wireless lock system.

Additionally, many embodiments of the invention can be configured to be installed on a doorway or other gateway that lacks a mortise or other hardware suitable for mounting. As will be discussed in more detail below, the wireless smart locking system may be installed on fence gates, or on almost any conventional doorway, even outdoors. The combination of utilizing outdoor-rated components installed without the need for a mortise or other hardware can allow for more control and peace of mind for the user as they can be in control and be notified of the activity of the doorway without their presence. In addition, embodiments may include a manual switch which can unlock the door in case of an emergency, which is suitable for installations such as yard gates where hasty escapes (e.g., in the event of a fire) may be required.

The description herein is not to be taken in a limiting sense, but is made merely for the purpose of describing the general principles of exemplary embodiments. The scope of the disclosure should be determined with reference to the claims. Reference throughout this specification to "one embodiment," "an embodiment," or similar language means that a particular feature, structure, or characteristic that is described in connection with the referenced embodiment is included in at least the referenced embodiment. Likewise, reference throughout this specification to "some embodiments" or similar language means that particular features, structures, or characteristics that are described in connection with the referenced embodiments are included in at least the referenced embodiments. Thus, appearances of the phrases "in one embodiment," "in an embodiment," "in some embodiments," and similar language throughout this specification can, but do not necessarily, all refer to the same embodiment.

Further, the described features, structures, or characteristics of the present disclosure can be combined in any suitable manner in one or more embodiments. In the description, numerous specific details are provided for a thorough understanding of embodiments of the disclosure. One skilled in the relevant art will recognize, however, that the embodiments of the present disclosure can be practiced without one or more of the specific details, or with other methods, components, materials, and so forth. In other instances, well-known structures, materials, or operations are not shown or described in detail to avoid obscuring aspects of the present disclosure.

In the following description, certain terminology is used to describe features of the invention. For example, in certain situations, both terms "logic" and "engine" are representative of hardware, firmware and/or software that is configured to perform one or more functions. As hardware, logic (or engine) may include circuitry having data processing or storage functionality. Examples of such circuitry may include, but are not limited or restricted to a microprocessor, one or more processor cores, a programmable gate array, a microcontroller, a controller, an application specific integrated circuit, wireless receiver, transmitter and/or transceiver circuitry, semiconductor memory, or combinatorial logic.

Logic may be software in the form of one or more software modules, such as executable code in the form of an executable application, an application programming interface (API), a subroutine, a function, a procedure, an applet, a servlet, a routine, source code, object code, a shared library/dynamic link library, or one or more instructions. These software modules may be stored in any type of a suitable non-transitory storage medium, or transitory storage medium (e.g., electrical, optical, acoustical or other form of propagated signals such as carrier waves, infrared signals, or digital signals). Examples of non-transitory storage medium may include, but are not limited or restricted to a programmable circuit; a semiconductor memory; non-persistent storage such as volatile memory (e.g., any type of random access memory "RAM"); persistent storage such as non-volatile memory (e.g., read-only memory "ROM", power-backed RAM, flash memory, phase-change memory, etc.), a solid-state drive, hard disk drive, an optical disc drive, or a portable memory device. As firmware, the executable code is stored in persistent storage.

The term "processing" may include launching a mobile application wherein launching should be interpreted as placing the mobile application in an open state and performing simulations of actions typical of human interactions with the mobile application. For example, the mobile application, FACEBOOK®, may be processed such that the mobile application is opened and actions such as user authentication, selecting to view a profile, scrolling through a newsfeed, and selecting and activating a link from the newsfeed are performed.

The term "mobile application" or "application for a mobile computing device" should be construed as a logic, software, or electronically executable instructions comprising a module, the mobile application being downloadable and installable on a network device. A mobile application may be a software application that is specifically designed to run on an operating system for a network device. Additionally, a mobile application may provide a graphical user interface (GUI) for the user of the network device. This GUI may provide means for inputting and/or displaying data.

The term "network device" should be construed as any electronic device with the capability of connecting to a network, downloading and installing mobile applications. Such a network may be a public network such as the Internet or a private network such as a wireless data telecommunication network, wide area network, a type of local area network (LAN), or a combination of networks. Examples of a network device may include, but are not limited or restricted to, a laptop, a mobile phone, a tablet, etc. Herein, the terms "network device," "endpoint device," and "mobile device" will be used interchangeably. The terms "mobile application" and "application" should be interpreted as logic, software or other electronically executable instructions developed to run specifically on a mobile network device.

Lastly, the terms "or" and "and/or" as used herein are to be interpreted as inclusive or meaning any one or any combination. Therefore, "A, B or C" or "A, B and/or C" mean "any of the following: A; B; C; A and B; A and C; B and C; A, B and C." An exception to this definition will occur only when a combination of elements, functions, steps or acts are in some way inherently mutually exclusive.

Figure 1A:
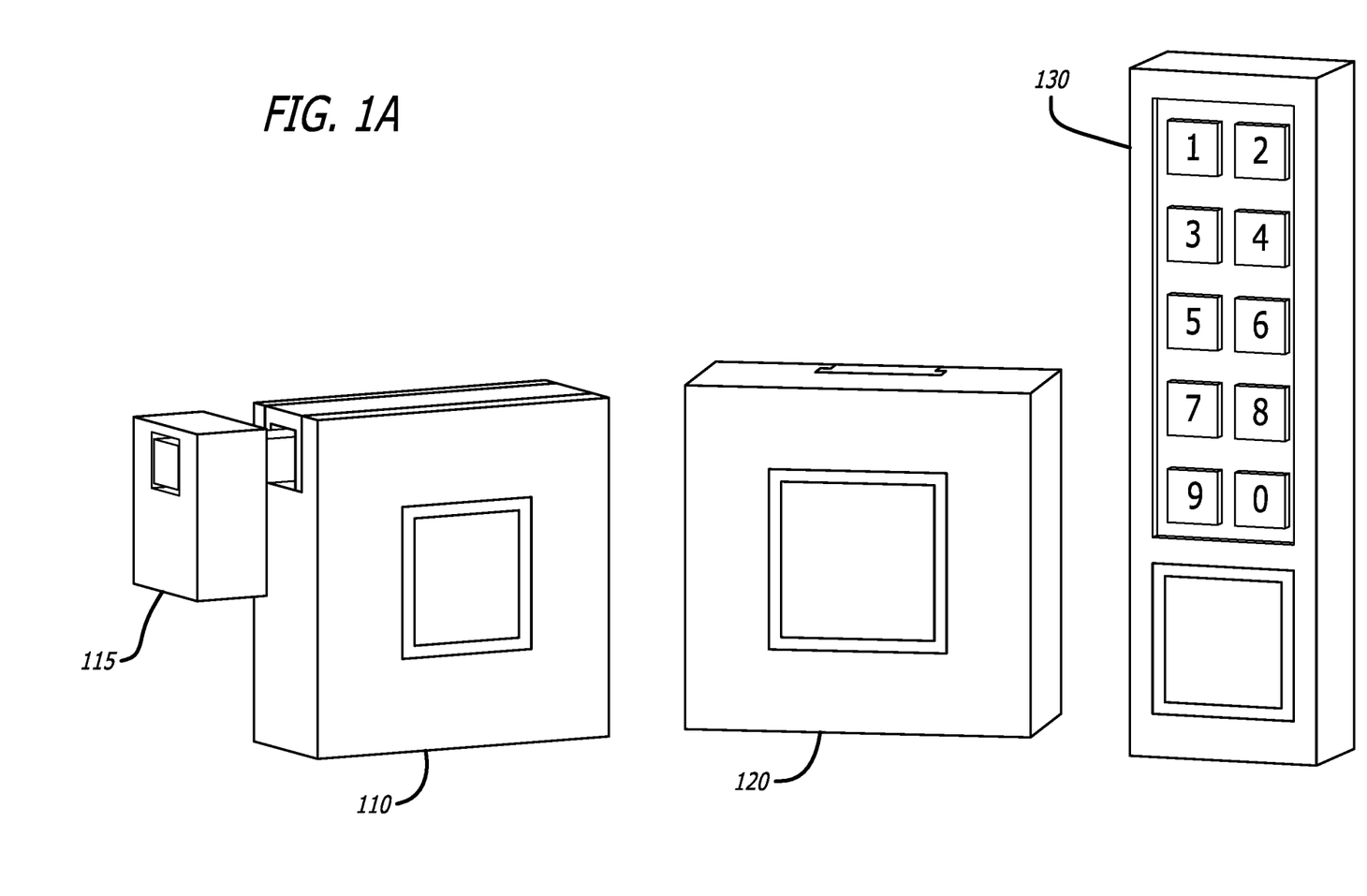
FIG. 1A is a front-side view of a wireless smart lock system in accordance with an embodiment of the invention.
Figure 1B:
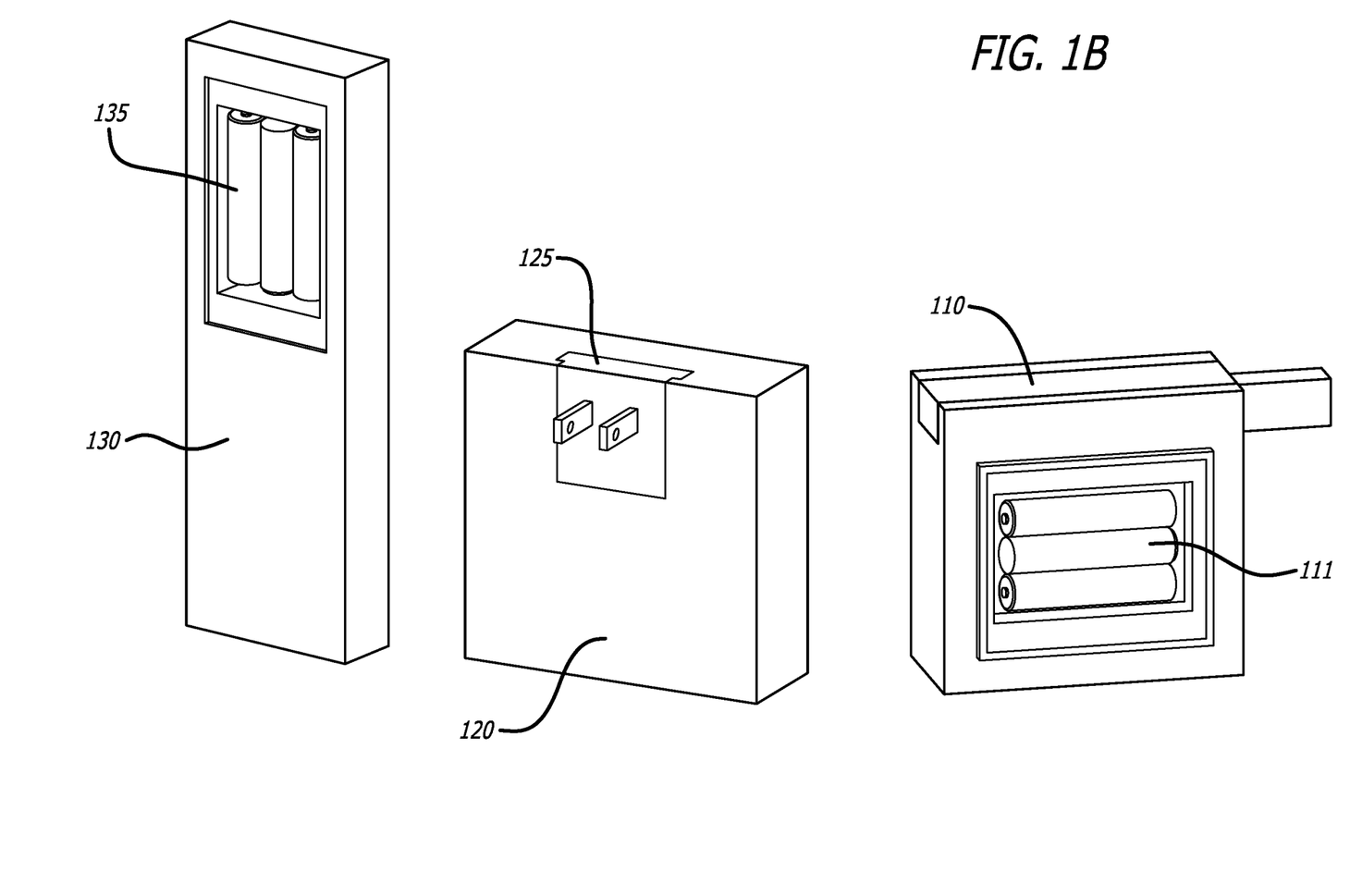
FIG. 1B is a rear-side view of a wireless smart lock system in accordance with an embodiment of the invention.

Referring to FIGS. 1A and 1B, front-side and rear-side views of a wireless smart lock system in accordance with various embodiments of the invention are shown. In many embodiments, the wireless smart locking system comprises at least a locking device 110, a bolt catch 115, and a keypad 130. Further embodiments can include a wireless communication bridge device 120 and a smart lock application (explained in more detail within the discussion of FIG. 3). FIG. 1A depicts an exemplary wireless smart lock system with a similar design. The smart lock system can allow for the wireless control of the locking device 110 via the keypad 130 which includes a plurality of combination buttons. Although depicted as a group of ten numeric combination buttons, it should be understood that any type of combination button may be used including alphanumeric keys, symbol keys, or directional keys. Furthermore, alternative methods of input can be utilized including biometric access in lieu of or in addition to, the combination button input.

One benefit of the wireless smart lock system of the present invention is that it can be configured to provide access to unlock the locking device 110 in numerous ways. For example, in a variety of embodiments, the keypad 130 may issue a wireless unlocking command to the locking device 110, but the locking device 110 may also have a method of unlocking via direct access. In a number of embodiments, the locking device 110 can also provide a manual button to press to issue an unlocking command to retract the bolt from the bolt catch 115. By way of example and not limitation, the locking device 110 depicted in FIG. 1A may utilize the center square of the design as a button that can be depressed to generate the unlock command. In this way, the wireless smart lock system can allow for quick exit from a locked area, such as a gate in a home during an emergency such as a fire. This can be provided without the need to provide a combination or key.

Of course, the ability to utilize a button to issue an unlock command can be configured by the user to be active or not. Certain installations of the locking device 110 may not be suitable for quick manual access to a button. For example, installation on a half-height gate would not be effective in certain instances if the unlock button was prominently exposed. In certain embodiments, the ability to adjust the state of the manual button can be configured via the smart lock application or via an adjustment provided within a setup process on the locking device 110 itself.

The design of the wireless smart lock system can be configured with materials suitable for outdoor use. Typical smart or wireless locking systems are often only rated for indoor use. Additionally, the use of the coupling feature between the locking device 110 and the bolt catch 115 allow for the wireless smart lock system to be installed on a variety of entryways that would otherwise not be suitable for locking. For example, traditional smart locking systems are configured to be installed on both sides of the doorway and utilize the internal space of the doorway as well as a pre-existing mortise. This traditional configuration isn't compatible with many doorways or gates that users may desire to lock and/or regulate traffic. Thus, many embodiments of the wireless smart lock system can be installed on a variety of gates and doorways without regards to their thickness.

Furthermore, installation on particular gates and doorways may be problematic as traditional locking systems can be circumvented by simply reaching over the doorway and turning the knob or other access point on the opposing side to gain access. In a variety of embodiments, the wireless smart lock system can be configured to regulate such access to avoid these limitations.

Gates, fences, and other doorways can be locked through the installation of the smart lock system whereas traditional locks and knobs typically require through holes drilled and/or sturdy loops added to allow padlocks to be utilized. Although various smart padlocks may be configured to attach and secure a gate, access may still not be granted upon unlocking. Specifically, as a padlock rests and secures two or more hoops or other mechanisms on a doorway/gate, the padlock still needs to be manually removed from the secured side. Thus, even in the event of a padlock being remotely unlocked, access may still not be granted and even if somehow released from the loops, the smart padlock would simply fall to the ground and be unusable without manual reinstallation.

Powering the smart lock system can be accomplished utilizing a combination of alternating (AC) and direct current (DC) sources based on the type of smart lock system installed. In numerous embodiments, the locking device 110 will include a battery compartment 111 that can be configured to accept any mixture of batteries as needed. The embodiment depicted in FIG. 1B utilizes a series of three cylindrical batteries, which are typically sized as AA and AAA. Similarly, the keypad 130 includes a rear battery compartment 135 that also is configured to house a series of three cylindrical batteries. As would be understood by those skilled in the art, many combinations of battery sizes and types may be utilized depending on the type of application desired. For example, the rear battery compartments 111, 135 may utilize single rechargeable battery packs, or may be configured to utilize smaller coin (i.e. "watch") batteries.

In most embodiments, the wireless communication bridge device 120 utilizes alternating current (AC) power. In the embodiment depicted in FIG. 1B, the wireless communication bridge device 120 utilizes a plug-in AC power. It is contemplated that the wireless communication bridge device 120 can be configured for either 110 volts (V) or 220V in order to provide international compatibility. Similar to the locking device 110 and the keypad 130, the wireless communication bridge device 120 can be outdoor rated, including the plug-in power source 125, which is desired to be coupled with an outdoor-rated AC power source outlet. Other embodiments of the wireless communication bridge device 120 can be configured to be installed and accept a direct hard-wired AC power line source.

Figure 2:
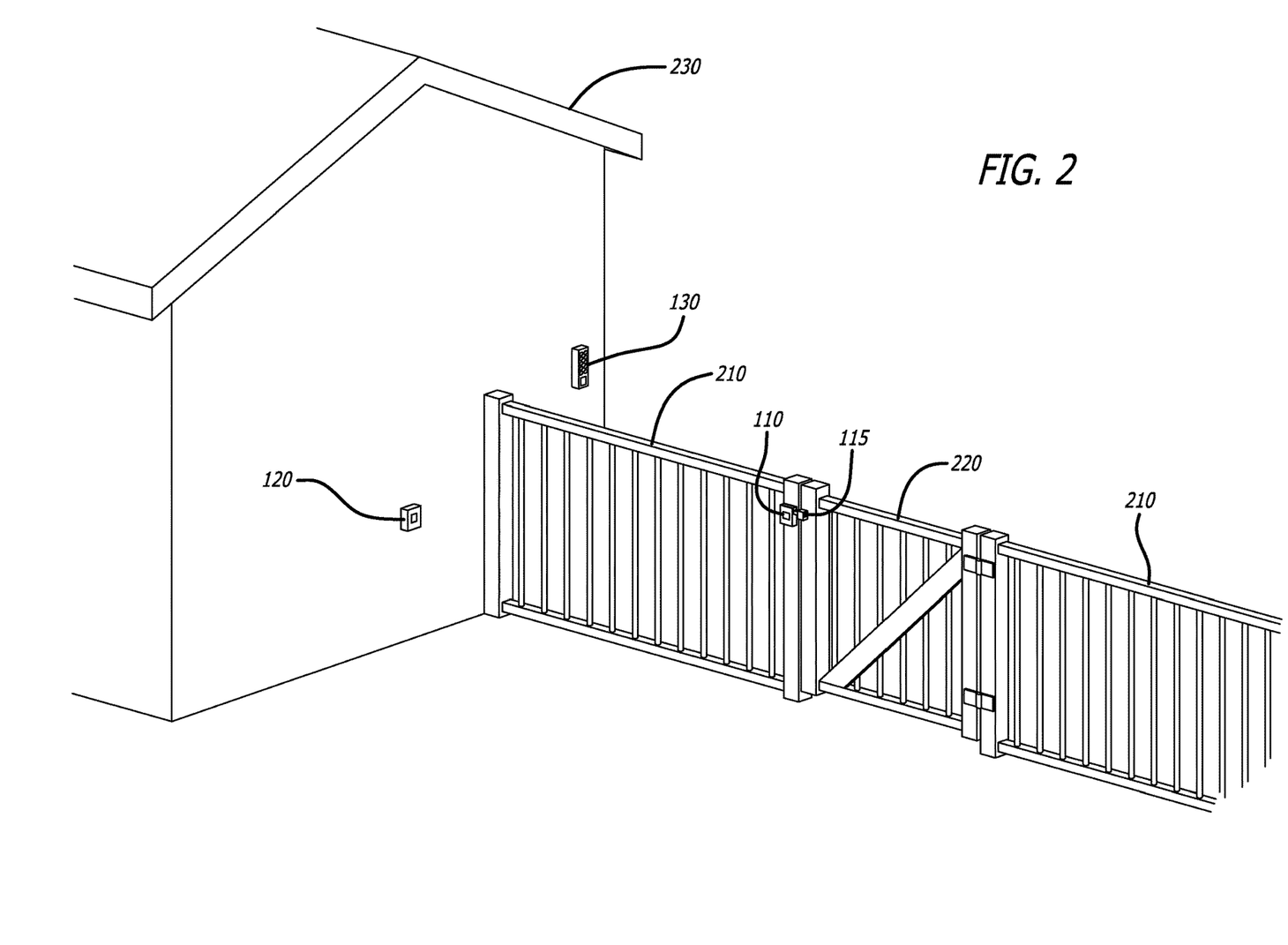
FIG. 2 is a system diagram of an installed wireless smart lock system in accordance with an embodiment of the invention.

FIG. 2 is a system diagram of an installed wireless smart lock system in accordance with an embodiment of the invention is shown. As discussed above with reference to FIGS. 1A and 1B, the wireless smart lock system can be installed in a variety of gates and doorways that would not otherwise be suitable or practical for traditional smart locks. The embodiment depicted in FIG. 2 comprises an exemplary smart lock installed on a fence gate 210, 220 next to an attached building 230. As can be seen, a length of fence 210 comprises a gate 220. The gate 220 has the bolt catch 115 installed on the opening side. Adjacent to the bolt catch 115, the locking device 110 is installed on the fence 210. The installation of the locking device 110 next to the bolt catch 115 allows for the bolt within the locking device 110 to couple with the bolt catch 115 in a static position when protruded, creating a lock.

The keypad 130 is installed on the adjacent building 230 relative to the fence 210. The keypad can be utilized by a user to send an unlock command to the locking device 110 upon entering a valid combination on the combination buttons. In various embodiments, the keypad 130 can be installed on a gate, a fence or any structure such that it is within wireless communication range of the locking device 110 and/or wireless communication bridge device 120. In certain embodiments, the wireless communication bridge device 120 is also installed on or within the building 230. The installation of the wireless communication bridge device 120 can be done by plugging it in to an AC outlet located on or within the building 230. The wireless communication bridge device 120 can facilitate wireless communications between the keypad 130 and the locking device 110. This can be accomplished by acting as a repeater for the back and forth communication signals between the devices 110 130. The wireless communication bridge device 120 may also provide a wireless signal and further external communication with other devices such as an internet connected server, or with a cellular phone signal from a user.

Installation of the wireless smart lock system can be accomplished by drilling or otherwise adhering the locking device 110 and bolt catch 115 on the gate 220 and adjacent fence 210, with the keypad being installed or adhered to another nearby surface as needed for ease of access or use. The wireless communication bridge device 120 can be installed anywhere with both AC power and a wireless connection to the smart lock system.

Figure 3:
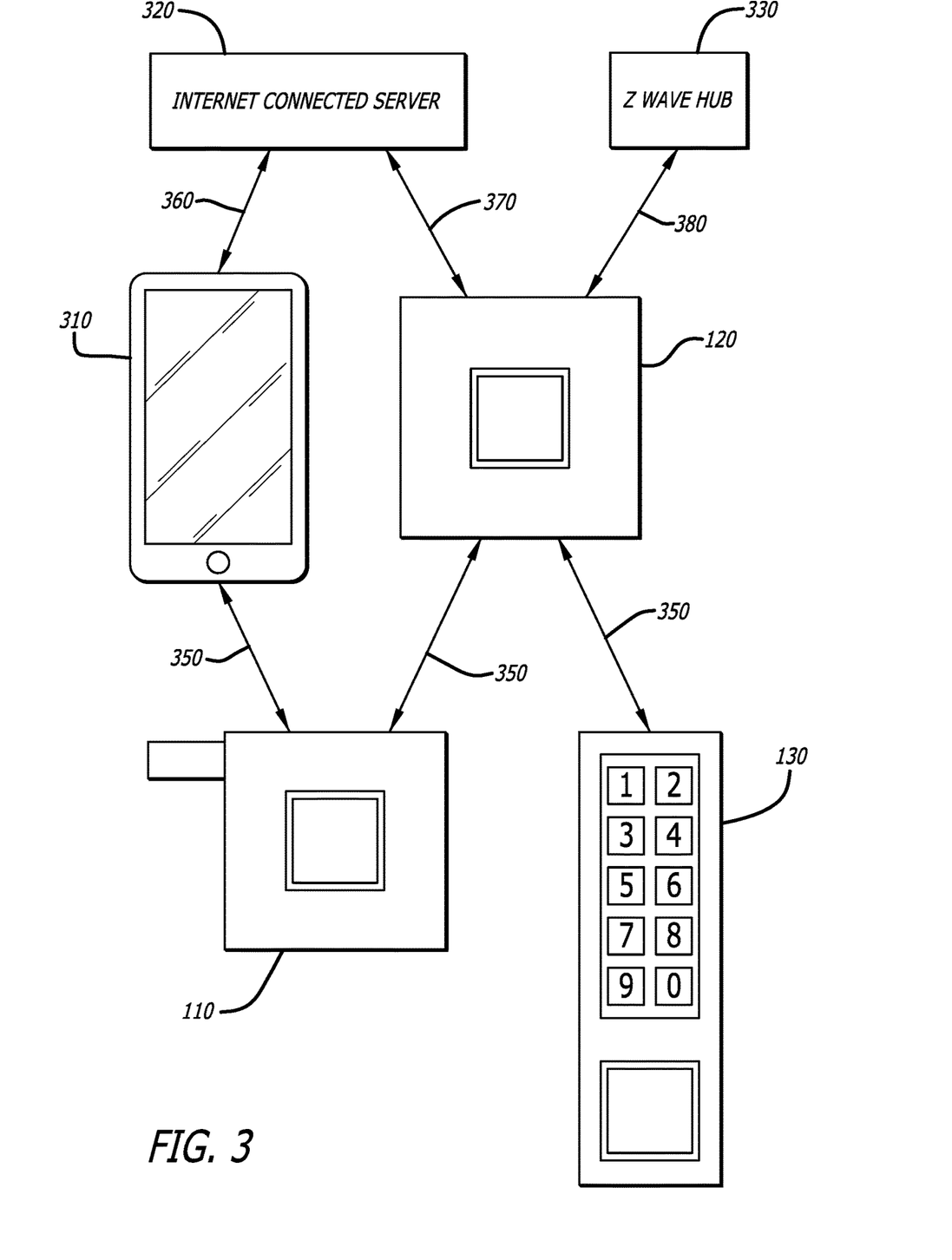
FIG. 3 is a conceptual schematic illustrating communication links between components of the wireless smart lock system in accordance with one embodiment of the invention.

Referring to FIG. 3, a conceptual schematic illustrating communication links between components of the wireless smart lock system in accordance with one embodiment of the invention is shown. The wireless smart lock system can utilize a variety of wireless signals and connections to facilitate use. As depicted in the conceptual illustration of FIG. 3, the locking device 110, the keypad 130, the wireless communication bridge device 120, and a mobile computing device 310 are all connected via a first type of wireless connection 350. In certain embodiments, the first wireless connection type 350 can be configured to be a short-range radio frequency (RF) or Bluetooth® signal.

In order to facilitate the wireless communications, a plurality of wireless communication transceivers are used. In many embodiments, the locking device 110 and keypad 130 include wireless transceivers that can generate and receive signals within a short-range proximity. The short-range signals are utilized in order to increase overall battery life. The wireless communication bridge device 120 however, is provided an AC power source and can thus, utilize both longer-range transceivers, but may also incorporate a plurality of wireless communication transceivers in order to communicate with multiple types of devices at various distances away. Although the communication links of the first connection type 350 are shown as connected to particular devices, it is understood that the transceivers in each device can establish wireless communication links in other combinations and arrangements. For example, in some embodiments the basic wireless communication of the smart lock system is between the locking device 110 and the keypad 130, which can occur with no other connections required.

Furthermore, wireless communication transceivers can be operated by processors embedded within the locking device 110, wireless communication bridge device 120, and keypad 130. These processors may be coupled with a memory that comprises logic that instructs the processor to operate the respective device as desired by the manufacturer and/or user. By way of example and not limitation, the locking device 110 may include time tracking logic that can track and process the progression of time which may interact with a command logic that can receive locking commands from a user that include associated time-based data. In this way, a locking device 110 may receive a valid and authenticated lock command to retract the bolt from the bolt catch 115 at a specific time. The time tracking logic can wait until the specified time to notify the command logic to issue an unlock command, thus unlocking the gate. Both the locking device 110 and keypad 130 can include communications logic that facilitates the wireless connections, processes the incoming and outgoing data, as well as authenticates prior to further execution. In certain embodiments, the keypad 130 communicates the entered data through the system to an internet connected server 320 which executes authentication logic which can generate and transmit a lock/unlock command to the locking device 110. Further embodiments that may also include locking logic include the wireless communication bridge device 120, the mobile computing device 310, and the internet connected server 320.

The keypad 130 can include combination logic that stores a master combination that can issue the unlock command to the locking device 110. The combination logic can further store temporary valid combinations that can be associated with time-based data to deactivate after a specified or pre-determined time and/or number of uses. For security reasons, it may be beneficial to store and process the combination logic on the locking device 110 and instead only have the keypad transmit the combination codes as combination data such that a universal wireless "unlock" code is not possible to determine and spoof. The locking device 110 would then send back to the keypad 130 data indicating a successful or unsuccessful combination which may be processed and utilized in a visual or audio cue to the user.

The wireless communication bridge device 120 also comprises logic for communicating with other devices. In a number of embodiments, the wireless communication bridge device 120 is configured with multiple transceivers such that the wireless communication bridge device 120 can establish wireless communication links with multiple devices on a variety of frequencies and protocols. By way of example and not limitation, the embodiment of the wireless communication bridge device 120 depicted in FIG. 3 can establish wireless communication links of a first protocol 530 with the locking device 110 and keypad 130 as well as a second, longer range communication protocol (e.g. Wi-Fi) link 370 and a third, mid-range home-automation protocol (e.g., Z-Wave) link 380. The wireless communication bridge device 120 can be configured to establish and maintain these wireless communication links as well as process them as needed. In some embodiments, the wireless communication bridge device 120 can be used to rebroadcast or repeat the signals transmitted from the keypad 130 and the locking device 110 and vice-versa.

In a variety of embodiments, the smart lock system includes a wireless lock system mobile computing application that can be processed on a mobile computing device 310 or other network device. Utilizing this application, the mobile computing device 310 can add further functionality to the wireless smart lock system. For example, the locking device may be configured to be pinged and respond with lock status data associated with the current state of the lock which can be indicated to a user via a graphical notification as to whether the locking device 110 is either locked or unlocked (i.e. the bolt is either in the protruded or retracted position).

Furthermore, via the first type of wireless communication link 350, the application can be configured to allow a user to enter time-based data that can include particular times that the locking device 110 is to lock and/or unlock. In further embodiments, the application can utilize other biometric or geographical data to generate a lock command to unlock the locking device 110. For example, a user may have the wireless smart lock configured to unlock when the user gets within a certain proximity to the locking device 110. This can be determined from data utilized within or received from the mobile computing device 310. In certain embodiments, the lock commands may be transmitted by near-field receivers (NFRs) located within the mobile computer device 310.

In additional embodiments, the application on the mobile computer device 310 can be configured to allow an authorized user to add a combination that can be used to unlock the locking device 110. In one example, this can be done within a setup process upon initial installation or reset of the wireless smart lock system. In still further embodiments, temporary or time-based combinations could be generated that can be transmitted to the locking device 110 and/or keypad 130. In this way, a user could generate a temporary or permanent combination that is not their own master and/or permanent combination and configure the smart lock system to expire the temporary combination after a pre-determined amount of time and/or number of uses. In additional embodiments, the application on the mobile computing device 310 can allow a user to label each generated combination and provide notifications to the user when they are used.

So, for example, a temporary combination to unlock the back gate of a house could be given to a relative or yard worker to water plants during a vacation, and be set to automatically expire upon the return date of the trip. Thus, no additional work is needed by the user to change the lock or reset any combinations upon conclusion of the temporary combination. In more embodiments, the temporary codes could be issued as a one-time or fixed number of uses combination codes for package or food delivery. Mail-carriers may also be given special combination codes that can be tracked and allow for the delivery of packages in a more secure area to reduce the threat of package theft. The user may also be notified that a package has arrived by receiving a notification once the mail-carrier specific combination code has been used.

The application on the mobile computing device 310 may establish and communicate with the locking device 110 and keypad 130 locally. However, in various embodiments, the effective range of communication can be increased by creating a fourth type of wireless connection (e.g., cellular or Wi-Fi) link 360. When the application is remote, it can be configured to communicate with an internet connected server 320. The internet connected server 320 may be any server that can receive, process, and pass on a signal to another device. The internet connected server 320 may be provided as a service provided by the manufacturer of the wireless smart lock system or it may be provided by the user. The wireless communication bridge device 120 can utilize the second, longer range communication protocol link 370 to also communicate with an internet connected server 320, which can then be utilized to establish an end-to-end communication link between the application being processed on the mobile computing device 310 and the wireless communication bridge device 120. While depicted as a single internet connected server 320, this is simplified to illustrate the establishing of an end-to-end connection. Those skilled in the art will understand that the internet connected server 320 can include many intermediary servers and computing devices depending on the type and location of connection. In cases of local connection, the internet connection server 320 may simply be a client running on a local router device. Furthermore, it is contemplated that the mobile computing device 310 may be a hard-wired or otherwise non-mobile computing device in particular embodiments. In many embodiments, the wireless communication bridge device 120 can also establish a connection with and transmit data to and receive data from a home automation hub (depicted as a Z Wave Hub) 330. As is commonly known to those skilled in the art, home automation protocols utilize unique standards and formats in order to reduce power consumption and increase range. The smart lock system may be desired to be integrated into a home automation and/or home security system. For example, a home security system could communicate with the wireless locking system to receive data indicating that a door is open and thus, the premises are not ready to be armed. Another example may be to provide a noise to the house guests that the smart lock system door was opened. While FIG. 3 depicts a Z Wave Hub 330, it is contemplated that any of a variety of wireless protocols may be utilized to better integrate the wireless lock system.

Figure 4A:
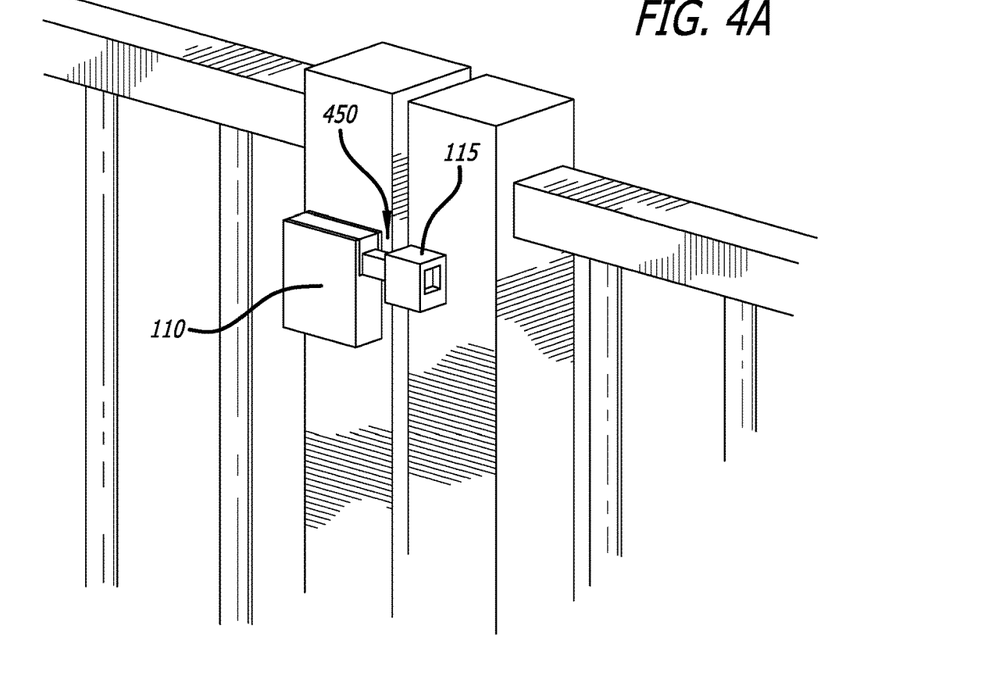
FIG. 4A is a visual illustration of an installation of the locking device and bolt catch with the bolt protruding and coupled with the bolt catch in accordance with one embodiment of the invention.
Figure 4B:
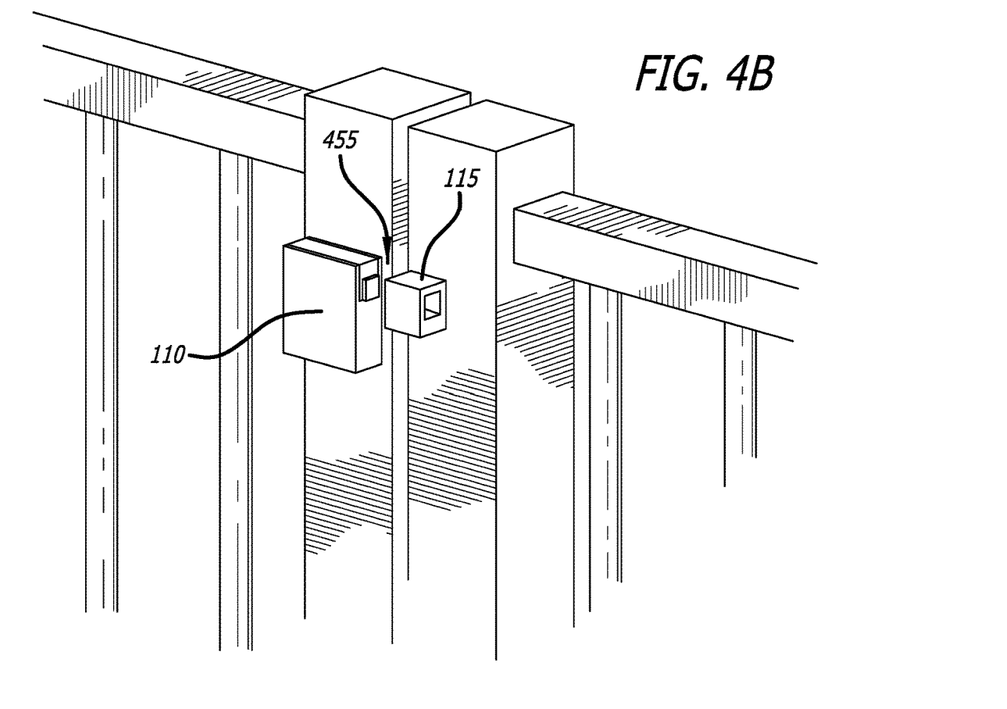
FIG. 4B is a visual illustration of an installation of the locking device and bolt catch with the bolt retracted and decoupled from the bolt catch in accordance with one embodiment of the invention.

Referring to FIGS. 4A and 4B, a visual illustration of an installation of the locking device and bolt catch coupled and decoupled with the bolt catch in accordance with various embodiments of the invention is shown. In a variety of installations, the locking device 110 and the bolt catch 115 will be installed adjacent to each other such that a protruded bolt 450 will couple with the bolt catch 115 to create an effective lock. FIG. 4A depicts a typical installation with the locking device 110 installed on a fence post while the bolt catch is installed on the edge of the gate. In order to accommodate a variety of doorways and gateways, the length of the protruded bolt 450 and bolt catch 115 can be adjustable depending on the gap between the fence and the gate. Additionally, spacers for the mounting plates of the locking device 110 and bolt catch 115 may be provided that can be utilized to facilitate installation and allow non-aligned doorways and gateways to be protected. In any event, no wires are used to complete the installation, which can allow for the smart lock system to be installed in a variety of locations that would otherwise be impractical or impossible to add a lock system.

In FIG. 4B, the retracted bolt space 455 between the locking device 110 and the bolt catch 115 provides enough space for the gate to be used normally. Because of the adjustable nature of the locking device 110 and bolt catch 115, the installation can be varied to best accommodate the needs of the user and the variable locations that the smart lock system may be installed. As can be seen in the embodiment depicted in FIG. 4B, because the bolt, when retracted, is substantially flush with the side of the locking device 110, the retracted bolt space 455 to the bolt catch 115 can be minimal and effective as long as the side of the locking device 110 does not extend beyond the opening frame, post, wall, etc. that it is installed upon.

Figures 5A, 5B, 5C, 5D:
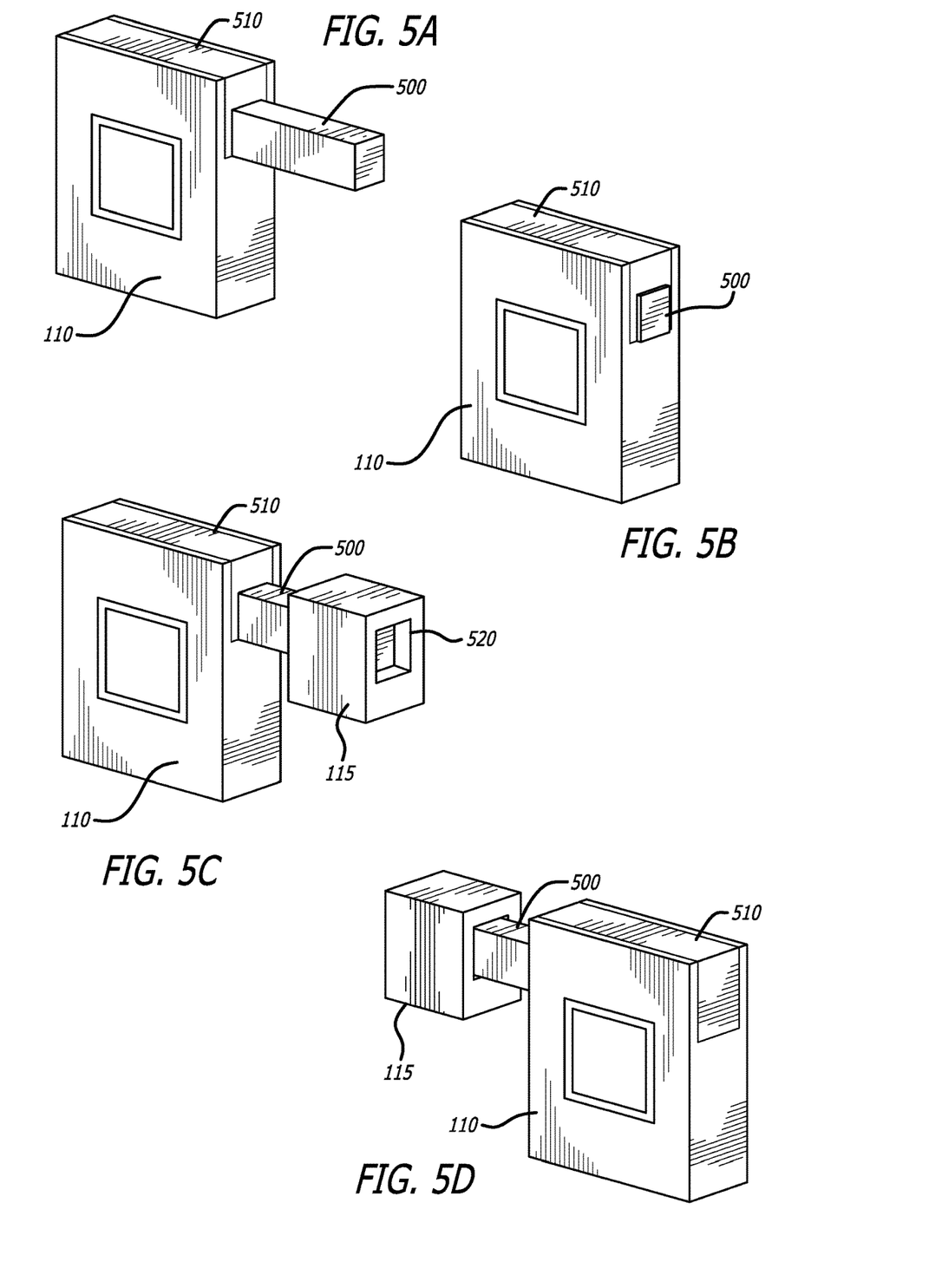
FIG. 5A is a conceptual illustration of the locking device with the bolt protruding in accordance with embodiments of the invention.
FIG. 5B is a conceptual illustration of the locking device with the bolt retracted in accordance with embodiments of the invention.
FIG. 5C is a conceptual illustration of the locking device with the bolt protruding and coupled to a bolt catch in accordance with embodiments of the invention.
FIG. 5D is a conceptual illustration of the locking device with the removeable portion reversed and the bolt protruding and coupled to a bolt catch in accordance with embodiments of the invention.

Referring to FIGS. 5A and 5B, a conceptual illustration of the locking device 110 with the bolt 500 protruding and retracted in accordance with various embodiments of the invention is shown. The locking device 110 can be configured to function in a number of various designs and shapes depending on the application required. The embodiment of the locking device 110 depicted in FIG. 5A shows a device with two portions: a housing portion and a removable portion 510. The removable portion 510 comprises at least the bolt 500 and the bolt housing utilized when the bolt 500 is retracted. In certain embodiments, the removable portion 510 may simply be a mechanical portion that responds solely from movements derived from the housing portion. In other words, the housing portion may, in some embodiments, comprise all of the power, processing, and motor control components, which cooperate to determine when to drive the motor or other motion components to facilitate movement of the bolt 500 out of the removable portion 510. In certain embodiments, the removeable portion 510 can comprise the motor or bolt translation components within the removeable portion 510 that simply responds to received control signals to extract and retract the bolt 500.

The embodiment depicted in FIG. 5B shows the bolt 500 in the retracted position of the locking device 110. As can be seen and understood by those skilled in the art, the bolt 500 is configured to only protrude out of a single side of the locking device 110 at a time. Referring to FIGS. 5C and 5D, a conceptual illustration of the locking device with the bolt protruding and coupled to a bolt catch in a plurality of positions is shown. As can be understood, openings that are desired to be locked can have openings on any side. Thus, traditional bolt locking methods and systems create a problem for a user who has, for example, purchased a bolt lock system for a first door with an opening on one side, and then desires to move the lock system to a second door with an opening on a side opposing the first side. In this instance, the user would be forced to purchase another lock, assuming traditional lock manufacturers offered locks in multiple directions for sale to begin with.

FIG. 5C depicts a locking device 110 with the bolt 500 protruding on the right side of the locking device 110 to couple with the bolt catch 115. The bolt catch 115 itself is designed to couple with the bolt 500 in a static position when the bolt 500 has been protruded by the locking device 110. In many embodiments, the bolt catch 115 includes a through hole mortice 520 that can serve multiple purposes. First, the distance between the locking device 110 and the bolt catch 115 can vary depending on the specific installation limitations and requirement desired. For example, a smart lock system installed in a high-risk location may not desire to have the bolt 500 exposed too much between the locking device 110 and the bolt catch 115. The through hole mortice 520 of the bolt catch 115 can allow for variations within various installations by allowing the installer to set the bolt catch 115 whatever distance away from the locking device 110 as needed, provided that the bolt catch 115 is still close enough to couple with the bolt 500. Additionally, the through hole mortice 520 of the bolt catch 115 can be utilized to retain the same bolt catch 115, even when the smart lock system requires for the installation to be reversed.

FIG. 5D depicts a similar installation as that depicted in FIG. 5C, however, the direction of the protruded bolt 500 has been changed. In a number of embodiments, the removeable portion 510 can be removed and taken out of the housing portion of the locking device 110 and then turned around and reinserted into the locking device 110 to create a reversed locking device 110 which can now be installed and utilized on an increasing number of fence gates and other openings. In many embodiments, changing the orientation of the removable portion includes removing the locking device 110 from a mounting bracket that couples with the locking device 110 for mounting on the doorway/gateway and then removing screws within the locking device 110. In other embodiments, the locking device 110 may be reversed by rotating the entire locking device 110 without the need to rotate a removeable portion 510. In these embodiments, mounting holes can be positioned either through the body of the locking device 110 or symmetrically on either side to accommodate the reversable function. The ability to release the removable portion 510 can be obscured from casual users by only allowing the removeable portion 510 to be removed once the bolt 500 is retracted, indicating that the user of the locking device 110 is at least present. It is further contemplated that creating and executing predetermined steps and/or combinations such as, but not limited to locking, unlocking, shaking, entering a setup mode, or pressing a hidden button can be utilized to restrict access to the removeable portion 510.

Information as herein shown and described in detail is fully capable of attaining the above-described object of the present disclosure, the presently preferred embodiment of the present disclosure, and is, thus, representative of the subject matter that is broadly contemplated by the present disclosure. The scope of the present disclosure fully encompasses other embodiments that might become obvious to those skilled in the art, and is to be limited, accordingly, by nothing other than the appended claims. Any reference to an element being made in the singular is not intended to mean "one and only one" unless explicitly so stated, but rather "one or more." All structural and functional equivalents to the elements of the above-described preferred embodiment and additional embodiments as regarded by those of ordinary skill in the art are hereby expressly incorporated by reference and are intended to be encompassed by the present claims.

Moreover, no requirement exists for a system or method to address each and every problem sought to be resolved by the present disclosure, for solutions to such problems to be encompassed by the present claims. Furthermore, no element, component, or method step in the present disclosure is intended to be dedicated to the public regardless of whether the element, component, or method step is explicitly recited in the claims. Various changes and modifications in form, material, work-piece, and fabrication material detail can be made, without departing from the spirit and scope of the present disclosure, as set forth in the appended claims, as might be apparent to those of ordinary skill in the art, are also encompassed by the present disclosure.

What is claimed is:

1. A wireless lock system, comprising:
a locking device including a retractable bolt and a first wireless communication transceiver;
a bolt catch configured to couple with the retractable bolt, wherein when coupled the bolt and the locking device are locked into a static position relative to the bolt catch;
wherein the locking device includes a command logic configured to:
receive time-based locking commands associated with one or more time-based data received by a locking system mobile computing application, wherein the locking system mobile computing application is configured to utilize one or more second wireless communication transceivers within a host mobile computing device to wirelessly communicate with the locking device; and
issue locking commands;
wherein the bolt protrudes from the locking device to couple with the bolt catch and decouples from the bolt catch and recedes into the locking device in response to one or more wireless signals; and
wherein the locking device and bolt catch are configured to be installed on a single side of a surface.

2. The wireless lock system of claim 1, further comprising a keypad, and a communication bridge device configured to receive wireless signals from the locking device and the keypad, and wherein the keypad is configured with a plurality of combination buttons and a third wireless communication transceiver to wirelessly communicate with the communication bridge device.

3. The wireless lock system of claim 2, wherein the locking system mobile computing application is configured to wirelessly communicate with the communication bridge device and the locking device.

4. The wireless lock system of claim 3, wherein the locking system mobile computing application is configured to:
establish a wireless communication link with the communication bridge device;
request lock status data from the locking device;
receive lock status data wirelessly from the locking device via the communication bridge device; and
display a notification to a user in response to the received lock status data.

5. The wireless lock system of claim 3, wherein the locking system mobile computing application is configured to:
establish a wireless communication link with the communication bridge device;

receive lock status data wirelessly from the locking device via the communication bridge device wherein the lock status data is transmitted upon a change in lock status of the locking device; and display a notification to a user in response to the received lock status data.

6. The wireless lock system of claim 3, wherein the locking system mobile computing application is configured to:

establish a wireless communication link with the communication bridge device; and transmit proximity data to the locking device;

wherein the locking device is configured to retract the bolt in response to a wireless signal received from a mobile computing device correlating to the proximity data.

7. The wireless lock system of claim 3, wherein the locking system mobile computing application is configured to:

establish a wireless communication link with the communication bridge device; and transmit time-based locking commands;

wherein the time-based locking commands are associated with the plurality of time-based data, and wherein the communication bridge device is configured to transmit a command to the locking device to either protrude or retract the bolt in response to the time-based locking commands.

8. The wireless lock system of claim 3, wherein the locking system mobile computing application is configured to:

receive a plurality of key code data as input;

establish a wireless communication link with an internet connected server;

transmit key code data to the internet connected server configured to:

establish a wireless connection with the communication bridge device;

receive keypad input data received from the keypad via the communication bridge device; and in response to the received keypad input data correlating to the transmitted key code data, transmit a lock command to the locking device via the communication bridge device.

9. The wireless lock system of claim 8, wherein the key code data is further comprised of time-based data, and the communication bridge device is further configured to transmit an unlock signal upon receiving a key code from the combination buttons that correlates to the received key code data that is received during a time that correlates to the time-based data.

10. The wireless lock system of claim 1, wherein the locking device comprises a housing portion and a removable portion; and wherein the retractable bolt is located within the removable portion which is configured to couple with the housing portion to form the locking device.

11. The wireless lock system of claim 1, wherein the removable portion is configured to couple with the housing portion in a plurality of ways including at least two configurations resulting in opposing retractable bolt directions when extended, allowing for installation in multiple orientations.

12. A wireless locking system, comprising:

a locking device including a retractable bolt and a first wireless communication transceiver;

a bolt catch configured to couple with the retractable bolt, wherein when coupled the bolt and the locking device are locked into a static position relative to the bolt catch;

wherein the locking device includes a command logic configured to:

receive time-based locking commands associated with one or more time-based data received by a locking system mobile computing application, wherein the locking system mobile computing application is configured to utilize one or more second wireless communication transceivers within a host mobile computing device to wirelessly communicate with the locking device;

wherein the bolt protrudes from the locking device to couple with the bolt catch and decouples from the bolt catch and recedes into the locking device in response to one or more time-based locking commands; and wherein the locking device and bolt catch are configured to be installed on a single side of a surface.

13. The wireless locking system of claim 12, further comprising a communication bridge device comprising a third wireless communication transceiver configured to wirelessly communicate to the locking device, a keypad comprising a fourth wireless communication transceiver to wirelessly communicate with the communication bridge device, wherein the communication bridge device rebroadcasts signals received from the locking device and the keypad in order to increase the potential wireless communication range between the locking device and the keypad.

14. The wireless locking system of claim 13, wherein the communication bridge device further comprises a plurality of third wireless communication transceivers configured to transmit and receive wireless signals from multiple wireless frequencies and protocols.

15. The wireless locking system of claim 14, wherein one of the wireless protocols utilized is the Z-Wave protocol.

16. The wireless locking system of claim 12, wherein the system is configured to be installed on a doorway without a mortise.

17. A wireless locking system, comprising:

a locking device including a retractable bolt and a first wireless communication transceiver;

a bolt catch configured to couple with the retractable bolt, wherein when coupled the bolt and the locking device are locked into a static position relative to the bolt catch;

wherein the locking device includes a command logic configured to:

receive time-based locking commands associated with one or more time-based data received by a locking system mobile computing application, wherein the locking system mobile computing application is configured to utilize one or more second wireless communication transceivers within a host mobile computing device to wirelessly communicate with the locking device;

wherein the bolt protrudes from the locking device to couple with the bolt catch and decouples from the bolt catch and recedes into the locking device in response to one or more time-based locking commands; and wherein the locking device and bolt catch are configured to be installed on a single side of a surface; and wherein the system further includes at least one of a communication bridge device comprising a third wireless communication transceiver configured to wirelessly communicate to the locking device, and a keypad comprising fourth a wireless communication transceiver.

18. The wireless locking system of claim 17, wherein the one or more second wireless communication transceivers of the host mobile computing device, utilized by the locking system mobile computing application, is configured to wirelessly communicate with the communication bridge device; and wherein the locking system mobile computing application is configured to:
- establish a wireless communication link with the internet connected server, wherein the internet connected server further establishes a communication link to the communication bridge device, and wherein the communication bridge device further establishes a wireless communication link with the locking device;
- request lock status data from the locking device;
- receive lock status data wireless from the locking device via the communication bridge device and the internet connected server;
- display a notification to a user in response to the received lock status data.

19. The wireless locking system of claim 17, wherein the one or more second wireless communication transceivers of the host mobile computing device, utilized by the locking system mobile computing application, is configured to wirelessly communicate with the communication bridge device; and wherein the locking system mobile computing application is configured to:
- receive a plurality of time-based data as input;
- establish a wireless communication link with the internet connected server, wherein the internet connected server further establishes a communication link to the communication bridge device, and wherein the communication bridge device further establishes a wireless communication link with the locking device;
- transmit time-based locking commands to the locking device via the established wireless communication link;
- wherein the time-based locking commands are associated with the plurality of time-based data, and wherein the locking device is configured to either protrude or retract in response to the time-based locking commands.

20. The wireless locking system of claim 17, wherein the one or more second wireless communication transceivers of the host mobile computing device, utilized by the locking system mobile computing application, is configured to wirelessly communicate with the communication bridge device, and wherein the fourth wireless communication transceiver of the keypad is configured to communicate with the communication bridge device, and wherein the keypad is configured with a plurality of combination buttons; and wherein the locking system mobile computing application is configured to:
- create and manage a plurality of key code data as input;
- establish a wireless communication link with the internet connected server, wherein the internet connected server further establishes a communication link to the communication bridge device, and wherein the communication bridge device further establishes a wireless communication link with the keypad;
- transmit an unlock signal to the locking device upon receiving a key code from the combination buttons that correlates to the received key code data.

21. The wireless locking system of claim 20, wherein the key code data is further comprised of time-based data, and the communication bridge device is further configured to transmit an unlock signal upon receiving a key code from the combination buttons that correlates to the received key code data that is received during a time that correlates to the time-based data.

* * * * *